(12) United States Patent
Van der Zaag et al.

(10) Patent No.: US 6,233,126 B1
(45) Date of Patent: May 15, 2001

(54) THIN FILM MAGNETIC HEAD HAVING LOW MAGNETIC PERMEABILITY LAYER, AND METHOD OF MANUFACTURING THE MAGNETIC HEAD

(75) Inventors: Pieter J. Van der Zaag; Jacobus J. M. Ruigrok, both of Eindhoven; Harald Van Kampen, Leiden, all of (NL)

(73) Assignee: U.S. Philips Corporation, New York, NY (US)

( * ) Notice: Subject to any disclaimer, the term of this patent is extended or adjusted under 35 U.S.C. 154(b) by 1278 days.

(21) Appl. No.: 08/698,193

(22) Filed: Aug. 15, 1996

Related U.S. Application Data

(63) Continuation of application No. 08/529,304, filed on Sep. 18, 1995, now abandoned, which is a continuation of application No. 08/201,931, filed on Feb. 24, 1994, now abandoned.

(30) Foreign Application Priority Data

Nov. 22, 1993 (BE) .................................................. 09301284

(51) Int. Cl.$^7$ ....................................................... G11B 5/39
(52) U.S. Cl. ................................................................ 360/321
(58) Field of Search ..................................... 360/113, 321

(56) References Cited

U.S. PATENT DOCUMENTS

| | | | |
|---|---|---|---|
| 4,425,593 | 1/1984 | Postma | 360/113 |
| 4,477,319 | 10/1984 | Abe et al. | 204/56 |
| 4,754,354 | 6/1988 | Jeffers | 360/113 |

*Primary Examiner*—Robert S. Tupper
(74) *Attorney, Agent, or Firm*—Norman N. Spain

(57) ABSTRACT

Thin film magnetic head has magnetoresistive element (23) and flux-guiding elements (117a,117b) of a material having a relatively high magnetic permeability, and an intermediate layer between the magnetoresistive element and the flux-guiding elements, the intermediate layer (21) being electrically insulating, and having a relatively low magnetic permeability of between 1.1 and 25. The low permeability intermediate layer increases the magnetic flux between the magnetoresistive element and the flux-guiding elements, and thereby improves the efficiency of the magnetic head.

12 Claims, 6 Drawing Sheets

THIN FILM MAGNETIC HEAD HAVING LOW MAGNETIC PERMEABILITY LAYER, AND METHOD OF MANUFACTURING THE MAGNETIC HEAD

This is a continuation of application Ser. No. 08/529,304, filed Sep. 18, 1995, now abandoned, which is a continuation of U.S. Ser. No. 08/201,931, filed Feb. 24, 1994, now abandoned.

BACKGROUND OF THE INVENTION

The invention relates to a magnetic head having a head face and a thin-film structure, with a magnetoresistive element and a flux-guiding element of a magnetically permeable material having a relatively high relative magnetic permeability, a peripheral area of the magnetoresistive element extending opposite the flux-guiding element and an electrically insulating intermediate layer being present at least between the peripheral area and the flux-guiding element.

A magnetic head of this type is known from U.S. Pat. No. 4,425,593 (PHN 9357, herewith incorporated by reference). The known magnetic head is a read head which is used for detecting information-representing magnetic fields on a magnetic recording medium moving with respect to the magnetic head, particularly a magnetic tape. The magnetic head has a head face and comprises a substrate of a ferrite which constitutes a magnetic yoke, together with two aligned layer-shaped flux guides of a material having a relatively high relative magnetic permeability, for example, a nickel-iron alloy whose relative magnetic permeability is typically 1000. The magnetic head also comprises an elongate layer-shaped magnetoresistive element (MR element) provided with equipotential strips which has contact faces at two opposite ends and has such a magnetic anisotropy that the easy axis of magnetization at least substantially coincides with its longitudinal axis. The MR element is arranged within the magnetic yoke in such a way that a gap, which is present between the flux guides, is bridged by the MR element. The flux guides have facing end portions which are present opposite peripheral areas of the MR element extending parallel to the head face. An insulation layer of quartz extends both between the ferrite substrate and the electrically conducting MR element and between the MR element and the electrically conducting flux guides. Consequently, the known magnetic head incorporates a non-magnetic, electrically insulating material in the overlap areas constituted by the peripheral areas of the MR element and the facing end portions of the flux guides.

A drawback of the known magnetic head is that, due to the distance caused by the non-magnetic material between the peripheral areas of the MR element and the facing end portions of the flux guides, only a small portion of the magnetic flux originating from the magnetic recording medium is actually passed through the MR element during operation. In other words, the known magnetic head has a low efficiency.

OBJECTS AND SUMMARY OF THE INVENTION

It is an object of the invention to provide a magnetic head of the kind described in the opening paragraph having an improved efficiency.

To this end, the magnetic head according to the invention is characterized in that the intermediate layer is magnetically permeable and has a relative magnetic permeability $\mu_r$ which complies with the condition: $1.1 < \mu_r < 25$. In the magnetic head according to the invention an intermediate layer having a relatively low relative magnetic permeability is used between the MR element and the flux-guiding element. It has surprisingly been found that such an intermediate layer yields a considerable increase of the magnetic flux between the MR element and the flux-guiding element when a magnetic medium is being read, and consequently has an essentially improved efficiency. The intermediate layer is preferably in direct contact with the magnetoresistive element as well as the flux-guiding element. It has even been found that an intermediate layer having a permeability of between 2 and 10 results in a surprisingly high efficiency.

The magnetic head according to the invention further has a technological advantage. It is relatively simple to form the intermediate layer having a relative permeability of between 1.1 and 25, while known deposition methods such as sputtering, MO-CVD or laser ablation are applicable. An oxidic soft-magnetic material such as a ferrite, for example MnZn ferrite, NiZn ferrite, LiZn ferrite, MgMnZn ferrite or a garnet, for example Co/Si doped YIG ($Y_3Fe_5O_{12}$) is preferably used for forming the intermediate layer. It has been found that the intermediate layer has the required relative permeability already at a thin layer thickness. The layer thickness d is preferably between 0.1 and 1.0 $\mu$m.

It is to be noted that U.S. Pat. No. 4,754,354 (herewith incorporated by reference) proposes to provide a magnetic guide having a relatively high relative magnetic permeability as an intermediate layer between an MR element and a magnetically permeable yoke portion. A drawback of the measure proposed in U.S. Pat. No. 4,754,354 is its very difficult realisation. From a technological point of view, it is not easy to form thin layers having a relatively high relative magnetic permeability, because the desired stoichiometry is difficult to realise in the microstructure to be formed. U.S. Pat. No. 4,754,354 describes as a sole example an $Fe_3O_4$ layer as a magnetic guide which is formed by means of the special techniques described in U.S. Pat. No. 4,477,319 (herewith incorporated by reference).

At least substantially the same effect can be achieved with the magnetic head according to the invention as with the magnetic head known from U.S. Pat. No. 4,754,354. However, the magnetic head according to the invention can be realised in a considerably simpler way than this known magnetic head.

It is an other object of the invention to improve the efficiency of the magnetic head described in the opening paragraph in a simple manner. Therefore, the invention also relates to a method of manufacturing a magnetic head having a head face and a thin-film structure, with a magnetoresistive element and a flux-guiding element having a relatively high relative magnetic permeability, in which a peripheral area of the magnetoresistive element extends opposite the flux-guiding element and in which an electrically insulating intermediate layer is present at least between the peripheral area and the flux-guiding element.

The method according to the invention is characterized in that magnetic material is deposited until said electrically insulating layer has a relative magnetic permeability $\mu_r$ of between 1.1 and 25. The method according to the invention is an easily realisable method of manufacturing a magnetic head having a high efficiency.

A practical embodiment of the method according to the invention is characterized in that magnetic material is directly deposited on the flux-guiding element for forming the intermediate layer, whereafter the magnetoresistive element is provided on the layer formed.

BRIEF DESCRIPTION OF THE DRAWINGS

These and other aspects of the invention will be apparent from and elucidated with reference to the embodiments to be described hereinafter.

In the drawings

DESCRIPTION OF THE PREFERRED EMBODIMENTS

Figure 1:
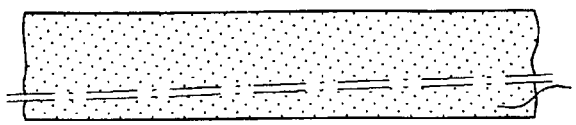
FIGS. 1 to 15 show various stages of a method of manufacturing a first embodiment of a magnetic head according to the invention.
Figure 2:
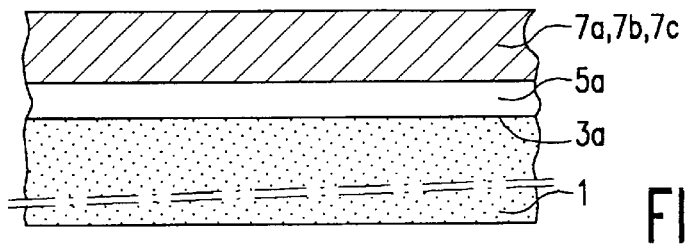
Figure 3:
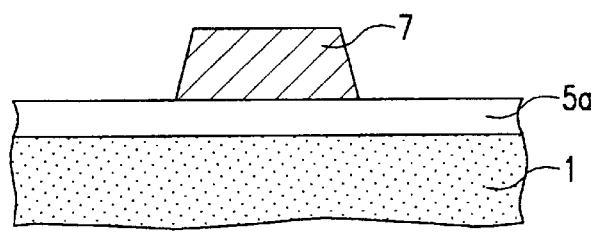
Figure 4:
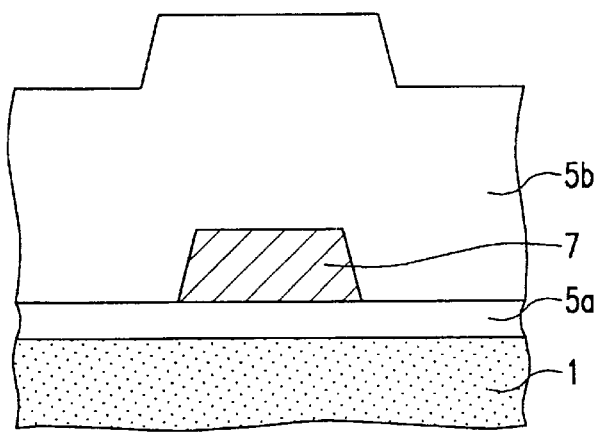
Figure 5:
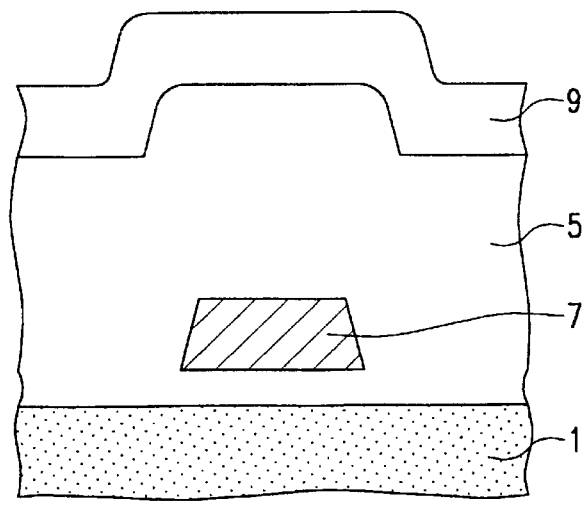
Figure 6:
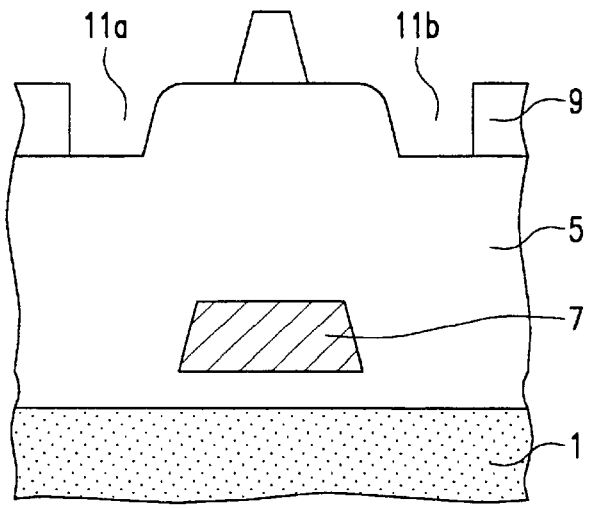
Figure 7:
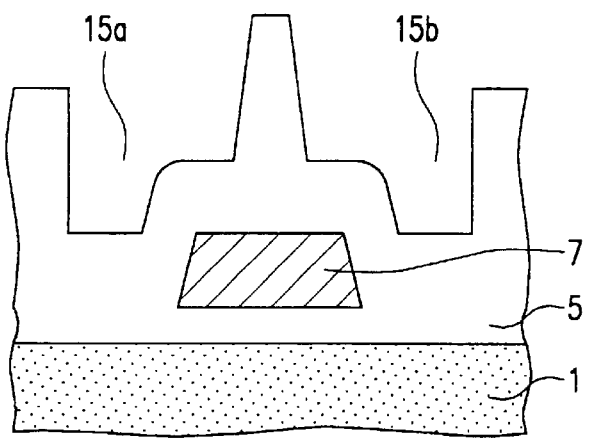
Figure 8:
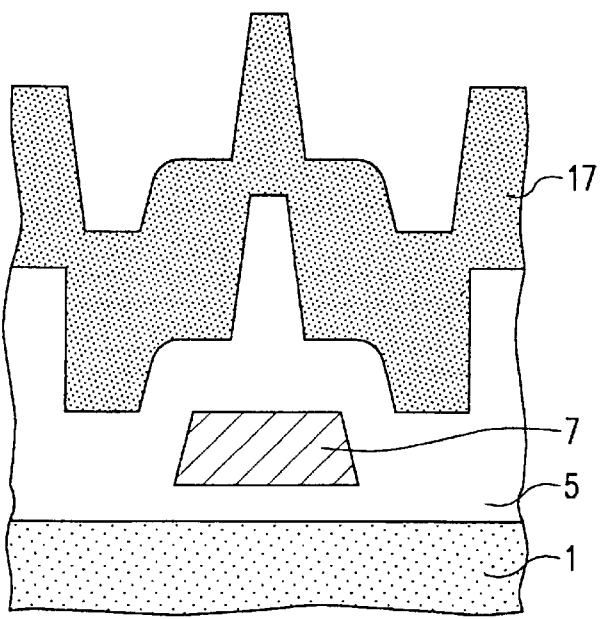
Figure 9:
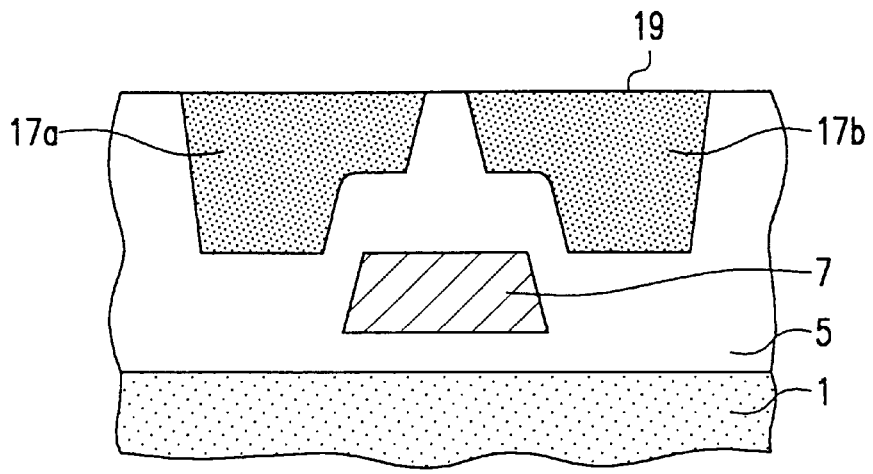
Figure 10:
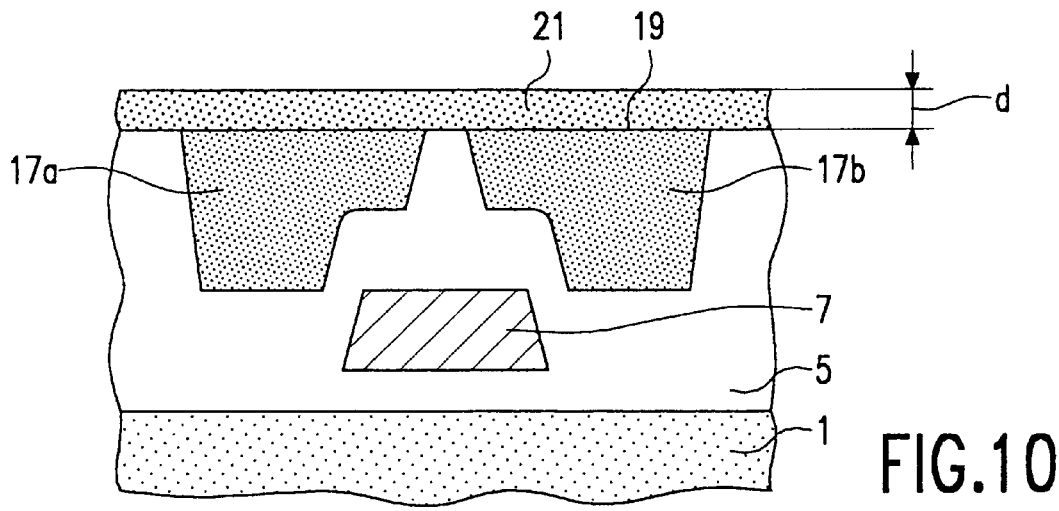
Figure 11:
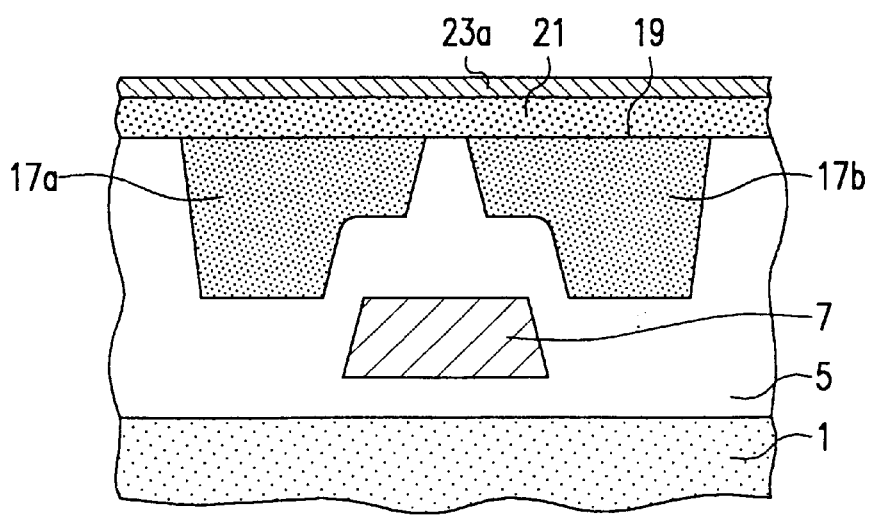
Figure 12:
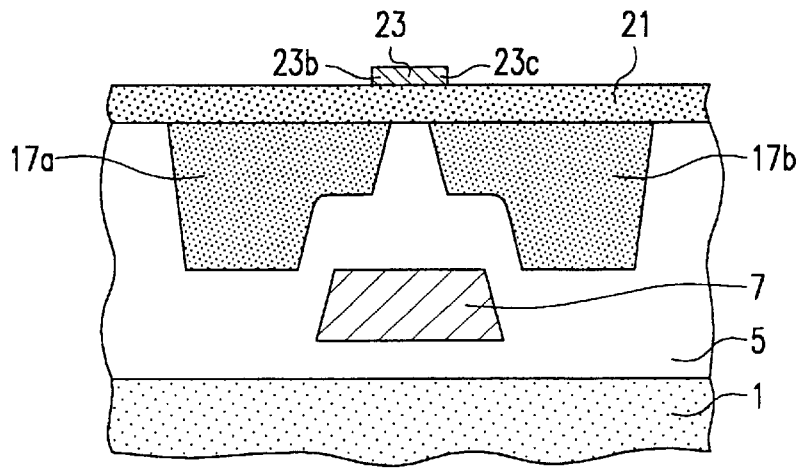
Figure 13:
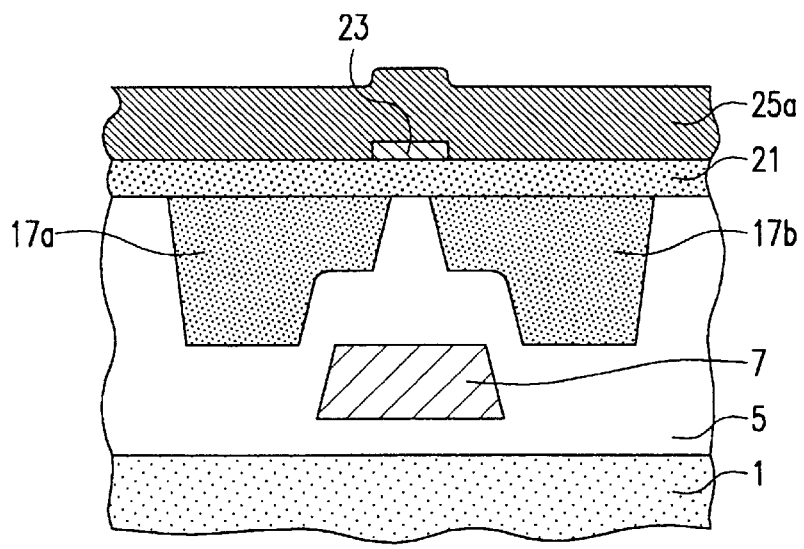
Figure 14:
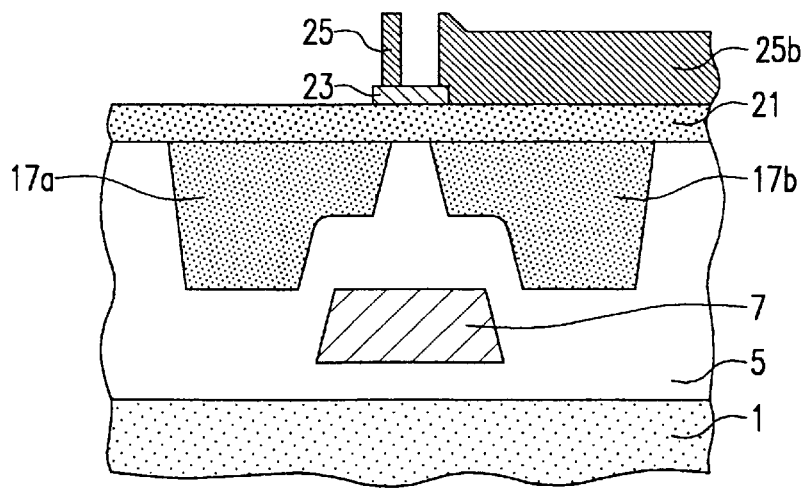
Figure 15:
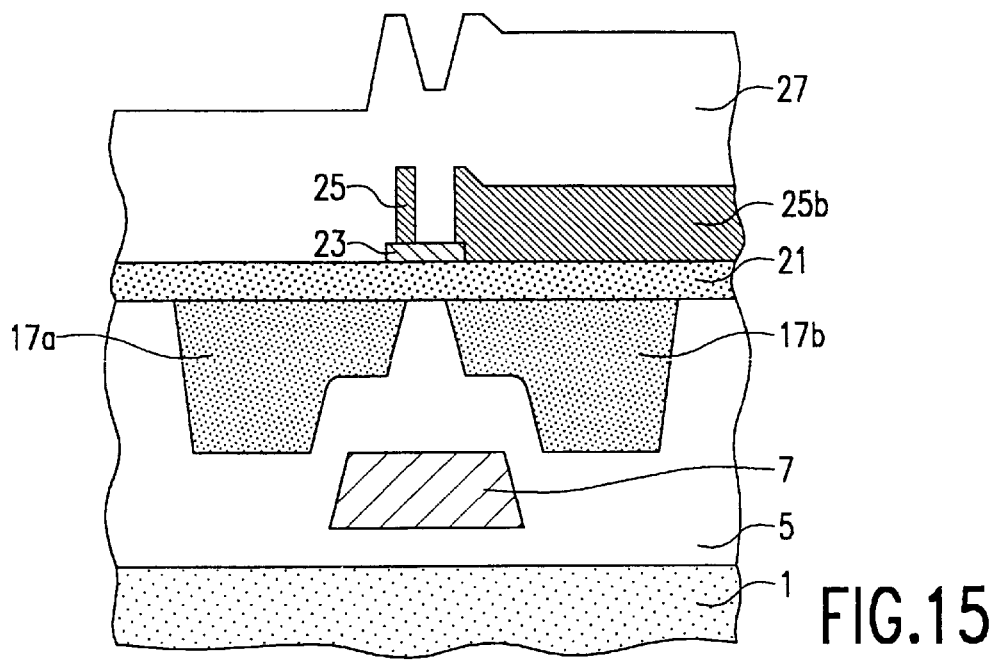
Figure 16:
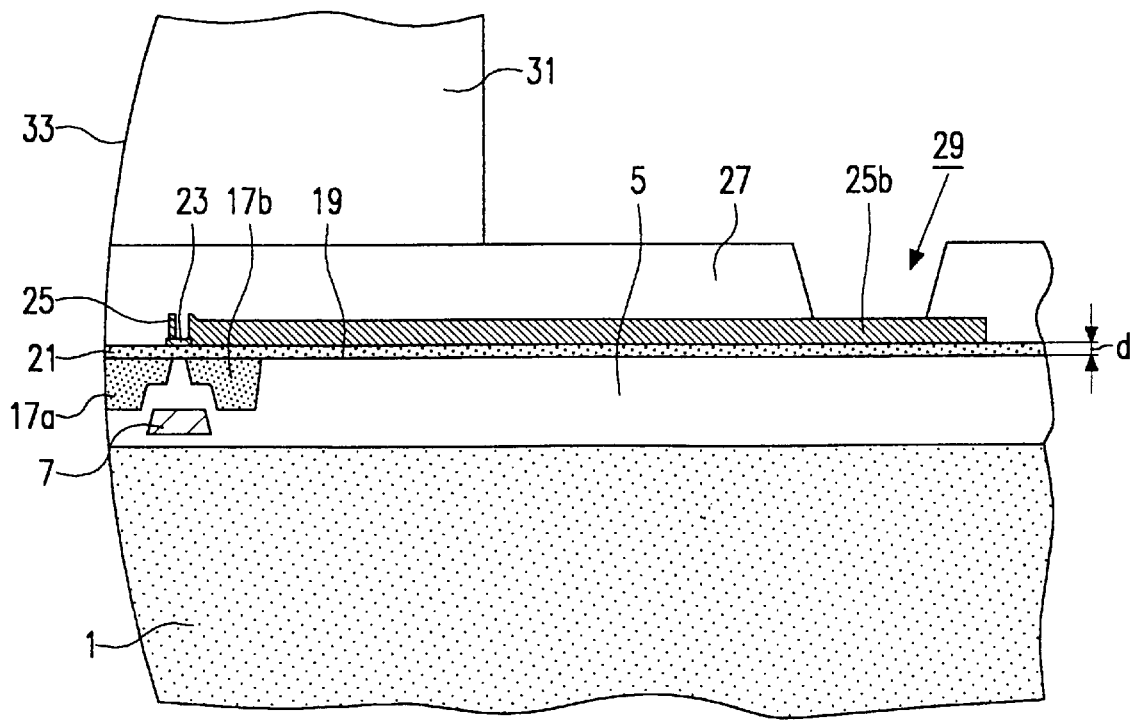
FIG. 16 shows diagrammatically the first embodiment of the magnetic head according to the invention.

A first embodiment of the magnetic head according to the invention as well as a method of manufacturing this embodiment will be described with reference to FIGS. 1 to 16. The method starts from a plane substrate 1 of ferrite, in this example an NiZn ferrite. An insulation layer 5a of $Al_2O_3$ is formed, for example, by means of sputtering deposition on a substrate face 3a obtained by polishing. Alternatively, $SiO_2$ may be used instead of $Al_2O_3$. Subsequently, an adhesive layer 7a of Mo, a layer 7b of Au and an adhesive layer 7c of Mo are successively deposited, for example by means of sputtering on the layer 5a for forming a test and/or bias winding 7.

An insulation layer 5b of, for example $Al_2O_3$ is provided, for example by means of sputtering on the layer 5a and the winding 7 on this layer. The layers 5a and 5b jointly constitute a relatively thick layer 5 of a non-magnetic material. A layer 9 of Mo is provided, for example by means of sputtering deposition on the layer 5 which is present on the substrate 1, whereafter Mo is removed in two areas 11a and 11b by means of etching. Subsequently, a sputter-etching operation is performed in which the layer 9 functions as a mask and in which two recesses 15a and 15b are formed in the main layer 5. After sputter-etching the remaining parts of the layer 9 are removed, for example by means of wet-chemical etching. A layer 17 of a soft-magnetic material is provided on the layer 5 thus structured, with the recesses 15a and 15b being filled up for forming two flux-guiding elements 17a and 17b. In this example the layer 17 is formed by sputtering deposition of an FeNbSi alloy. Instead of an FeNbSi alloy, it is alternatively possible to use a CoZrNb alloy, an FeSiAl alloy or an NiFe alloy. The soft-magnetic material from which the flux-guiding elements are formed have a relatively high to high relative magnetic permeability which is roughly between 100 and 2000.

After the layer 17 has been formed, a polishing treatment is carried out. A thin electrically insulating, magnetic intermediate layer 21 having a relative magnetic permeability of between 1.1 and 25 is formed on the main face 19 which is preferably obtained by means of mechanochemical polishing. The method described in European Patent Application no. 93200995.4 (PHN 14.428; herewith incorporated by reference) is preferably used in this case.

In this example the intermediate layer 21 has a relative permeability $\mu_r$ of 5. The intermediate layer 21, which has a layer thickness d of between 0.1 and 1.0 μm, is formed by means of laser ablation or MO-CVD of an oxidic soft-magnetic material, in this example MnZn ferrite. A layer 23a of a magnetoresistive material is formed on the intermediate layer 21, for which purpose an alloy of NiFe is sputtered in this example. The layer 23a is subsequently structured by means of a photoresist mask and etching to form a magnetoresistive element (MR element) 23. The MR element 23 bridges the distance between the two flux-guiding elements 17a and 17b, with peripheral areas 23b and 23c of the MR element 23 being present opposite the elements 17a and 17b and being magnetically coupled to the flux-guiding elements via said intermediate layer 21. A layer 25a of an electrically conducting material, for example Au is provided on the MR element 23, which layer is structured by means of a photoresist mask and etching to form equipotential strips 25 of a barberpole structure and to form electrically conducting strips 25b for the electrical connection of the MR element to a measuring device (not shown). Subsequently, an insulation layer 27 of, for example $Al_2O_3$ is provided by means of, for example sputtering deposition. Apertures 29 extending as far as the conducting strips 25b so as to render electrical connections possible are etched in this insulation layer, whereafter a protective counterblock 31 of, for example $BaTiO_3$ or $CaTiO_3$ is secured by means of, for example an adhesive agent. The layer 27 may be planed in advance to the desired thickness, for example by means of mechanical polishing. By means of processing operations, for example grinding, the unit now obtained is provided with a head face 33 for cooperation with a magnetic recording medium, particularly a magnetic tape.

Figure 17:
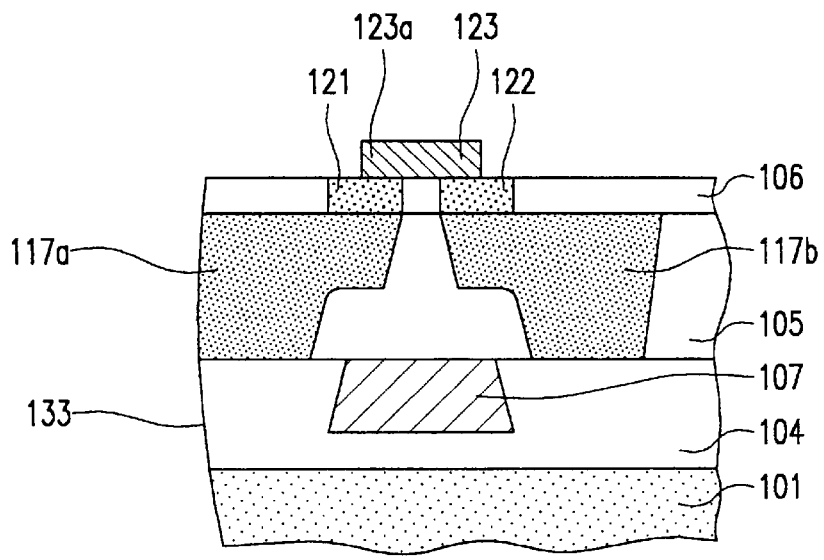
FIG. 17 shows diagrammatically a second embodiment of the magnetic head according to the invention.

FIG. 17 shows a second embodiment of the magnetic head according to the invention. This magnetic head has a head face 133 and comprises a thin-film structure provided on a ferrite substrate 101. The thin-film structure comprises as its main elements a magnetoresistive element (MR element) 123 oriented transversely of the head face 133 and a flux-guiding element 117a terminating in the head face 133, while an electrically insulating intermediate layer 121 having a magnetic permeability of between 1 and 25 extends between a peripheral portion 123a, which is parallel to the head face 133, of the MR element 123 and the flux-guiding element 117a. The intermediate layer 121, which is formed from an oxidic soft-magnetic material, in this example an MgMnZn ferrite, and preferably has a relative permeability $\mu_r$ of between 2 and approximately 10, is directly provided on the magnetically well-conducting flux-guiding element 117a and has a thickness d of between 0.1 and 1.0 μm. In this example the layer thickness is 3 μm. The peripheral portion 123a is present on said intermediate layer 121. If desired, the thin-film structure may have a furthier flux-guiding element 117b which is magnetically coupled to the MR element via the same intermediate layer (now denoted by the reference numeral 122) of a relatively low relative permeability. A bias winding 107 may also be present. The thin-film structure further comprises electrically insulating, non-magnetic insulation layers 104, 105 and 106.

Figure 18:
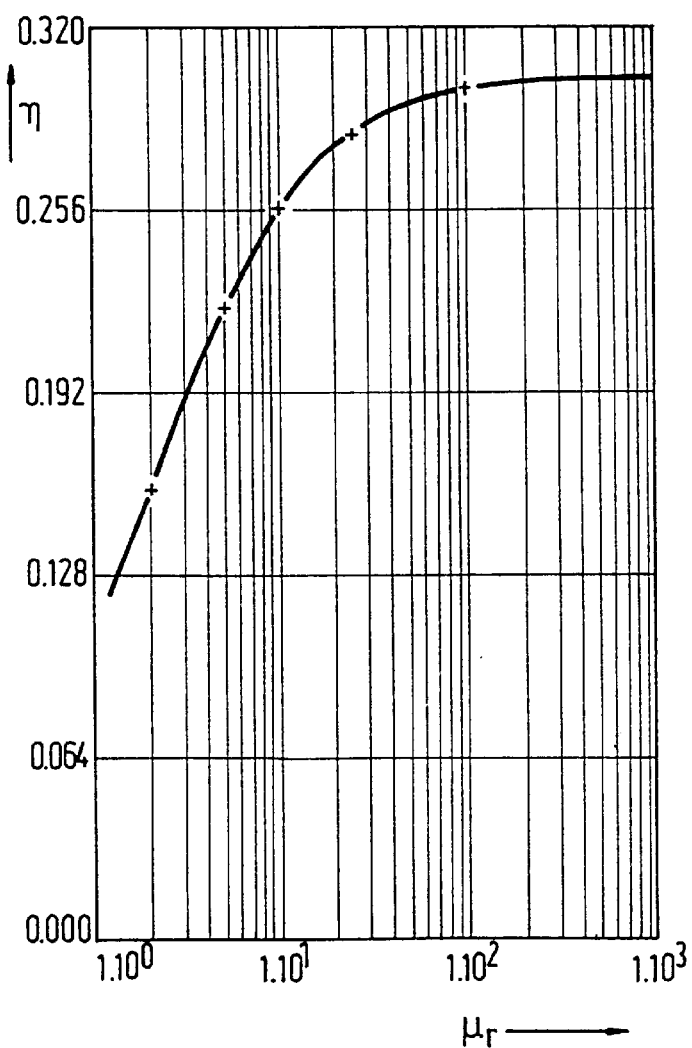
FIG. 18 is a graphic representation which shows the relationship between the relative magnetic permeability $\mu_r$ of the intermediate layer used and the efficiency η of the magnetic head for an embodiment of the magnetic head according to the invention.

FIG. 18 shows the computed efficiency η of an embodiment of the thin-film magnetic head according to the invention as a function of the relative magnetic permeability $\mu_r$ of the intermediate layer. In this embodiment the intermediate layer has a thickness of 0.5 μm and is in direct contact with both the magnetoresistive element and the flux-guiding element. It appears from the curve shown that there is a considerable increase of the efficiency between $\mu_r$=1.1 and $\mu_r$=25 and only a small further increase of efficiency with the higher relative magnetic permeabilities of the intermediate layer.

It is to be noted that the invention is not limited to the embodiments shown. For example, the magnetic head according to the invention also comprises an embodiment in which the magnetoresistive element adjoins the head face and the flux-guiding element which is present is spaced apart therefrom or an embodiment having a magneto-resistive element without a so called barberpole structure.

What is claimed is:

1. A thin film magnetic head comprising a thin film structure on a substrate, one end of the substrate and the thin film structure defining a head face, the thin film structure comprising at least one flux guiding element of a magnetically permeable material having a relatively high relative magnetic permeability on said substrate, a magnetoresistive element on the flux guiding element, a peripheral area of the magnetoresistive element overlying an edge of the flux-guiding element, and an intermediate layer of an electrical insulating material separating the magnetoresistive element and the flux guiding element, characterized in that at least the portion of the intermediate layer which is between the peripheral area of the magnetoresistive element and the flux guiding element is magnetically permeable and has a relative magnetic permeability in the range of about 1.1 to 25, thereby increasing the magnetic flux between the magnetoresistive element and the flux-guiding element, and improving the efficiency of the magnetic head.

2. A magnetic head as claimed in claim 1, characterized in that the magnetic permeability $\mu_r$ of the intermediate layer is between 2 and 10.

3. A magnetic head as claimed in claim 1, characterized in that the intermediate layer has a layer thickness d which complies with the condition $0.1 \leq d \leq 1.0$ $\mu$m.

4. A magnetic head as claimed in claim 1, characterized in that the intermediate layer is formed from an oxidic soft-magnetic material.

5. A magnetic head as claimed in claim 4, characterized in that the oxidic soft-magnetic material is a garnet.

6. A magnetic head as claimed in claim 4, characterized in that the oxidic soft-magnetic material is a ferrite.

7. The magnetic head of claim 6 wherein the ferrite is a member selected from the group consisting of a MnZn ferrite, a NiZn ferrite, an LiZn ferrite and a MgMnZn ferrite.

8. A magnetic head as claimed in claim 2, characterized in that the intermediate layer has a layer thickness d which complies with the condition $0.1 \leq d \leq 1.0$ $\mu$m.

9. A magnetic head as claimed in claim 2, characterized in that the intermediate layer is formed from an oxidic soft-magnetic material.

10. A magnetic head as claimed in claim 3, characterized in that the intermediate layer is formed from an oxidic soft-magnetic material.

11. A method of manufacturing a thin magnetic head comprising a thin film structure on a substrate, one end of the substrate and the thin film structure defining a head face, the thin film structure comprising at least one flux guiding element of a magnetically permeable material having a relatively high magnetic permeability on said substrate, a magnetoresistive element on the flux guiding element, a peripheral area of the magnetoresistive element overlying an edge of the flux-guiding element, and an intermediate layer of an electrical insulating material separating the magnetoresistive element and the flux guiding element, at least the portion of the intermediate layer which is between the peripheral area of the magnetoresistive element and the flux guiding element being magnetically permeable and having a relative magnetic permeability in the range of about 1.1 to 25, thereby increasing the magnetic flux between the magnetoresistive element and the flux-guiding element, and improving the efficiency of the magnetic head, said method comprising providing a flux-guiding element of a magnetically permeable material having a relatively high magnetic permeability on a substrate, providing a layer of an electrical insulating material on a surface of said flux-guiding element, depositing magnetic material on said layer of electrical insulating material until an intermediate layer having a relative magnetic permeability within the range of 1.1 to 25 is formed and providing a magnetoresistive layer on a surface of said intermediate layer.

12. The method of claim 11 wherein the intermediate layer has a thickness of between 0.1 $\mu$m and 1.0 $\mu$m.

* * * * *